Figure 1:
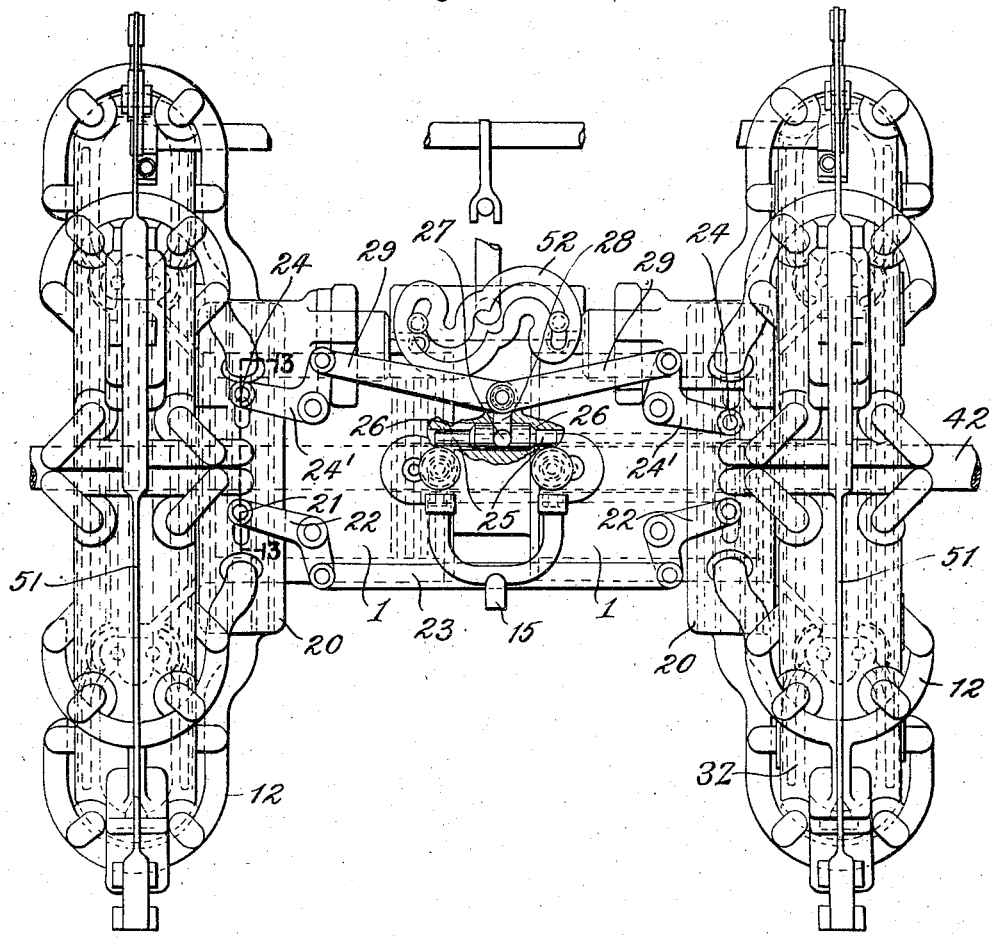

T. H. HOLROYD.
EXPLOSION APPARATUS FOR GENERATING AND DEVELOPING POWER.
APPLICATION FILED APR. 20, 1911.

1,008,912.

Patented Nov. 14, 1911.
13 SHEETS—SHEET 1.

Witnesses
Jas. K. McCathran
John H. Siggers

Inventor
Thomas H. Holroyd
By E. G. Siggers
atty.

T. H. HOLROYD.
EXPLOSION APPARATUS FOR GENERATING AND DEVELOPING POWER.
APPLICATION FILED APR. 20, 1911.

Patented Nov. 14, 1911.

T. H. HOLROYD.
EXPLOSION APPARATUS FOR GENERATING AND DEVELOPING POWER.
APPLICATION FILED APR. 20, 1911.

1,008,912.

Patented Nov. 14, 1911.
13 SHEETS—SHEET 4.

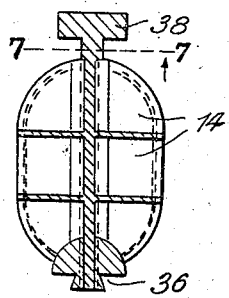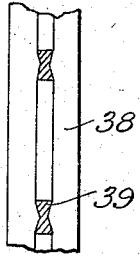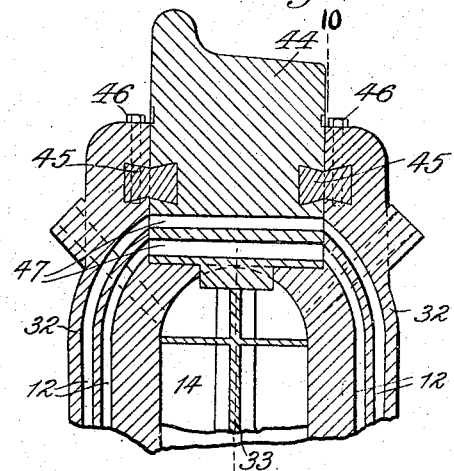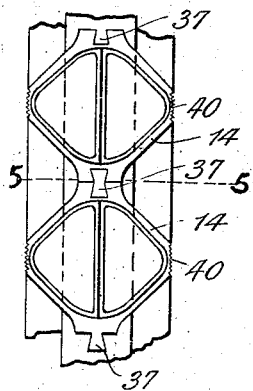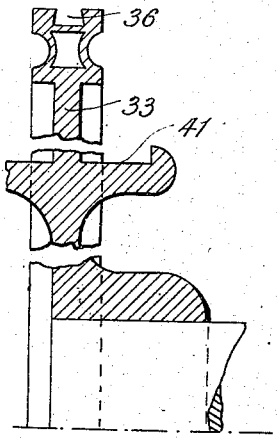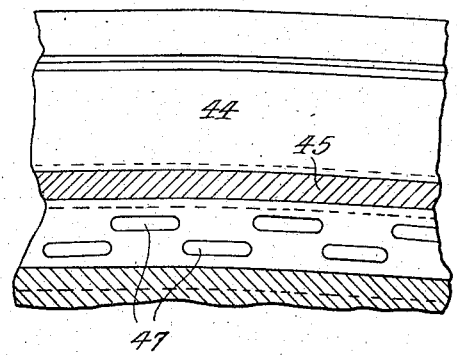

T. H. HOLROYD.
EXPLOSION APPARATUS FOR GENERATING AND DEVELOPING POWER.
APPLICATION FILED APR. 20, 1911.

1,008,912.

Patented Nov. 14, 1911.
13 SHEETS—SHEET 7.

Witnesses
Jas. F. McCathran
John R. Siggers

Inventor
Thomas H. Holroyd
By E. G. Siggers
atty.

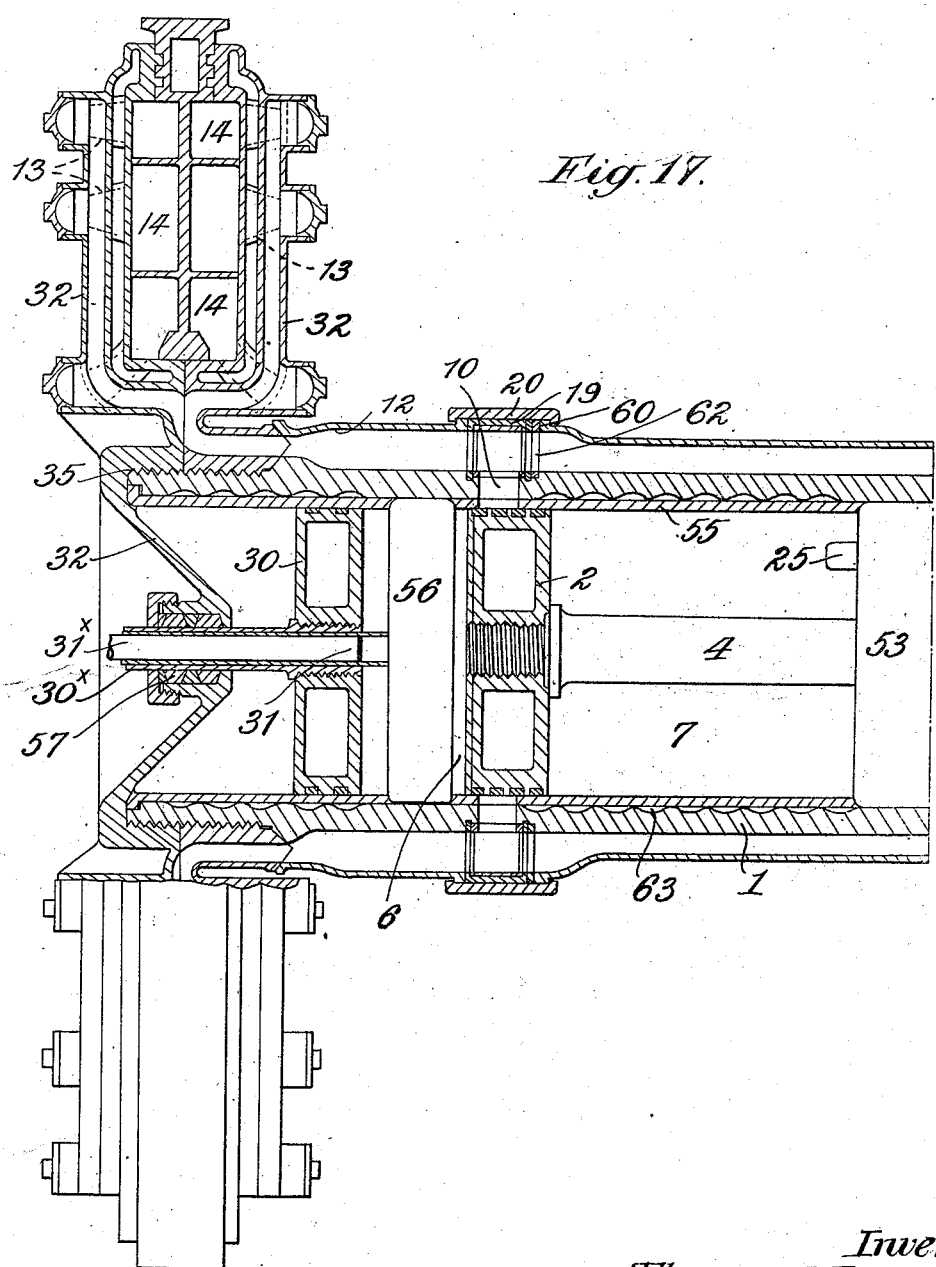

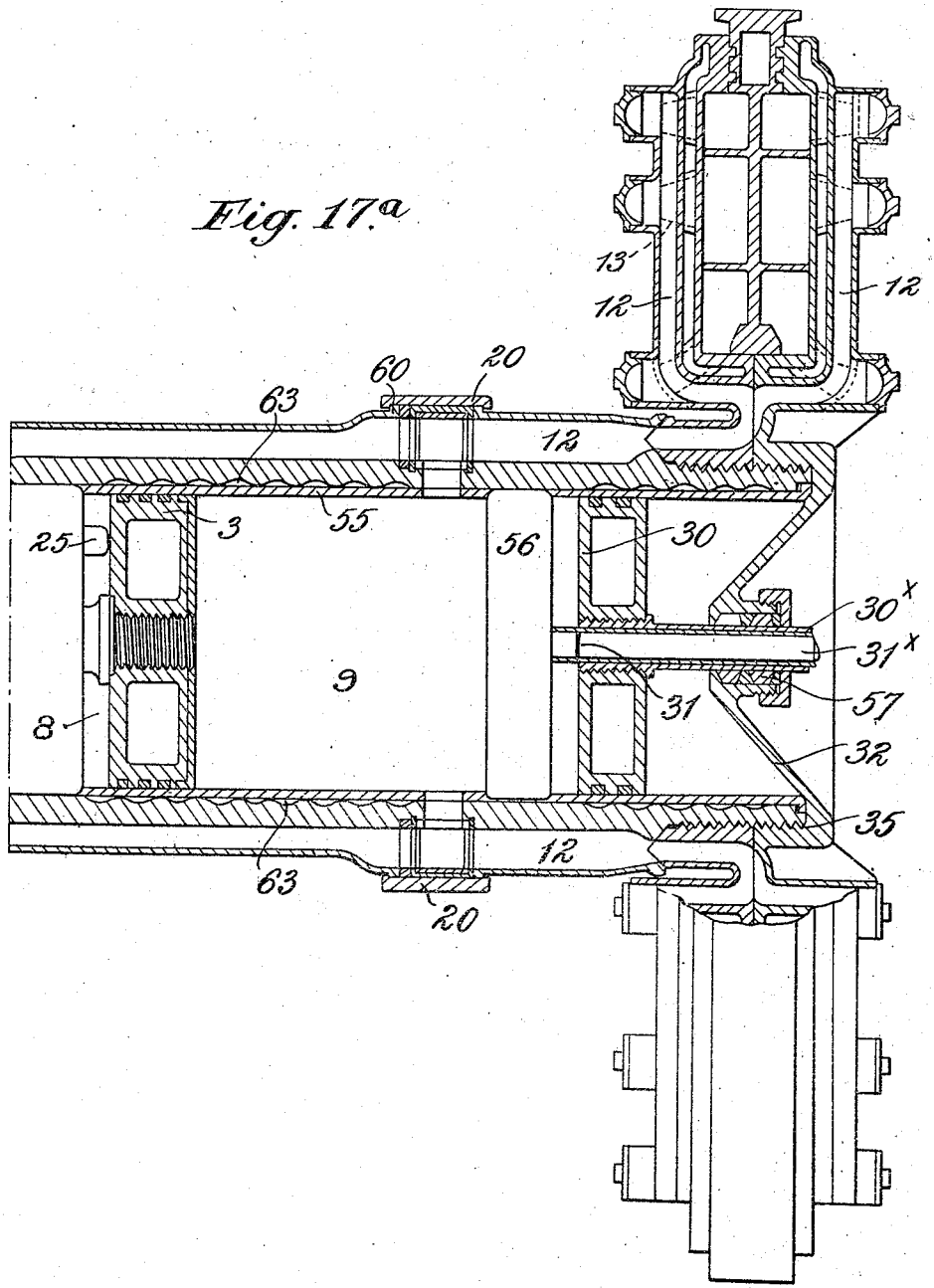

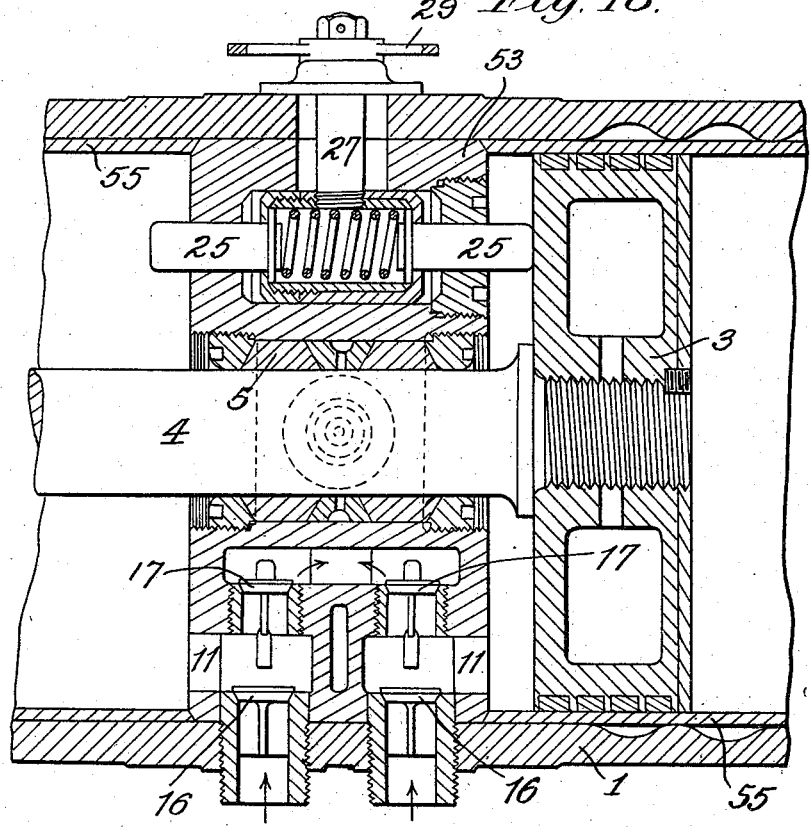
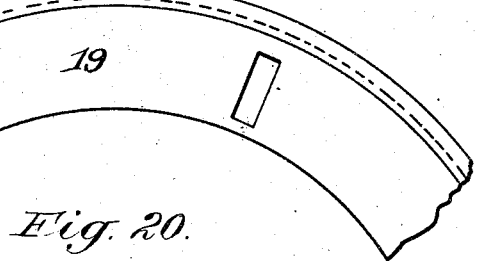

T. H. HOLROYD.
EXPLOSION APPARATUS FOR GENERATING AND DEVELOPING POWER.
APPLICATION FILED APR. 20, 1911.
1,008,912.
Patented Nov. 14, 1911.
13 SHEETS—SHEET 11.
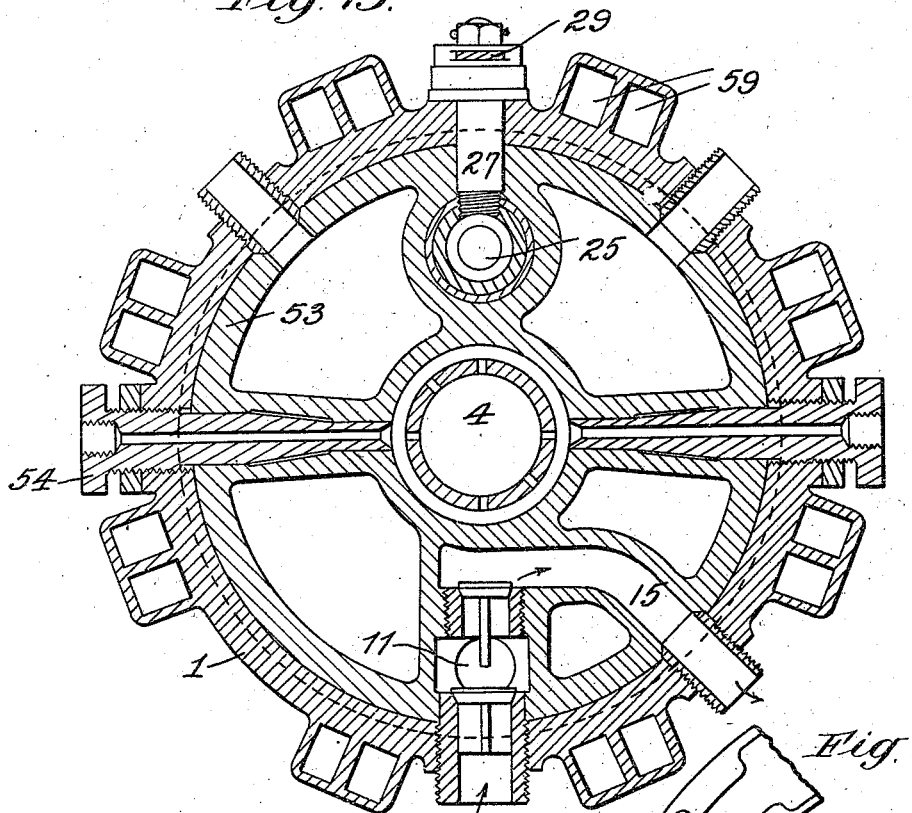
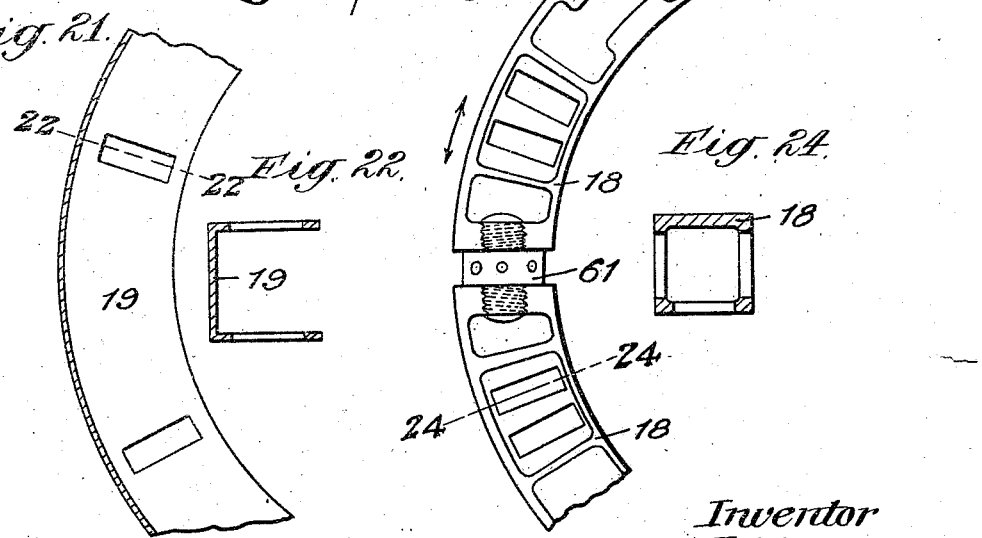
Witnesses
Inventor
Thomas H. Holroyd T. H. HOLROYD.
EXPLOSION APPARATUS FOR GENERATING AND DEVELOPING POWER.
APPLICATION FILED APR. 20, 1911.
1,008,912. Patented Nov. 14, 1911.
13 SHEETS—SHEET 12.
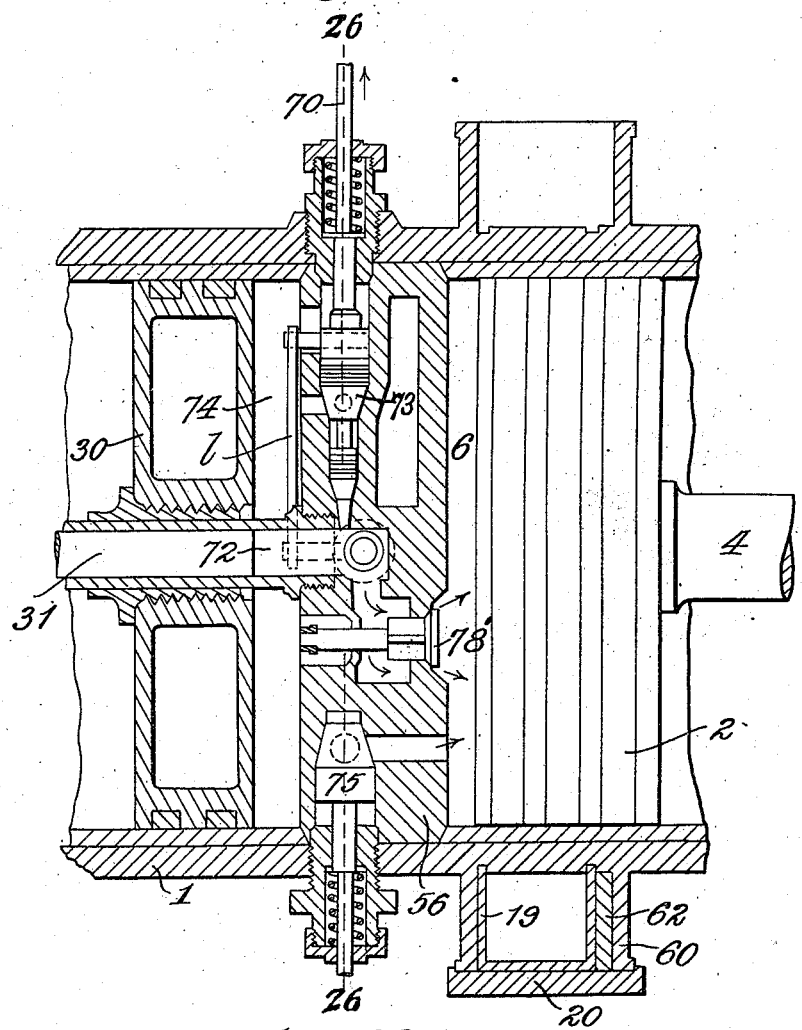
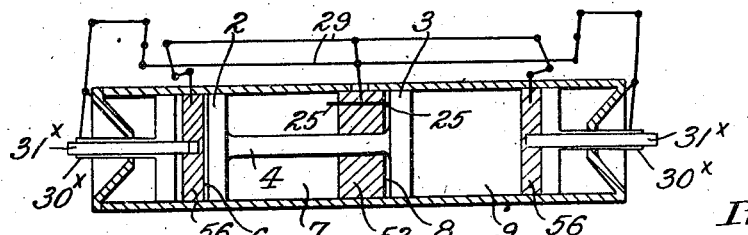

T. H. HOLROYD.
EXPLOSION APPARATUS FOR GENERATING AND DEVELOPING POWER.
APPLICATION FILED APR. 20, 1911.

1,008,912.

Patented Nov. 14, 1911.

13 SHEETS—SHEET 13.

Witnesses.

Inventor
Thomas H. Holroyd
By E. G. Siggins
atty.

UNITED STATES PATENT OFFICE.

THOMAS HOWARD HOLROYD, OF RICHMOND, ENGLAND.

EXPLOSION APPARATUS FOR GENERATING AND DEVELOPING POWER.

1,008,912.        Specification of Letters Patent.      Patented Nov. 14, 1911.

Application filed April 20, 1911. Serial No. 622,398.

*To all whom it may concern:*

Be it known that I, THOMAS HOWARD HOLROYD, a subject of His Majesty the King of England, residing at 34 Morley road, Richmond, in the county of Surrey, Kingdom of England, have invented a certain new and useful Improved Explosion Apparatus for Generating and Developing Power, of which the following is a specification.

This invention relates to an improved apparatus for generating and developing power and has for its object to provide a compact, light and efficient combination or arrangement that shall be capable of developing high or low powers within very wide limits and of being reversed while running at high speeds without danger.

The invention consists in the hereinafter described construction, arrangement and combination of parts constituting the improved power generator and according to which I employ in conjunction with one or more reversible elastic fluid turbines or rotating members mounted at any angle or position an internal combustion pulsating power or pressure generator confined within a single, double, or series of cylinders connected in multiple, twin, cross or tandem form. One end of each cylinder forms a combustion chamber and the other a direct air compressor or in some cases a hydraulic force pump for indirectly compressing the necessary air for combustion. The explosive mixture is intermittently supplied to the combustion chamber in measured quantities by means of a special charge supplying device which may be separate or in one with the cylinder and which is controlled by the same mechanism as the combustion, exhaust, and cut off valve.

Throughout the specification I wish it to be clearly understood that where I refer to any of the combined parts of my apparatus in the singular, such designation is also intended to cover the plural or vice versa.

In the accompanying drawings with reference to which I will describe my invention:—

Figure 2:
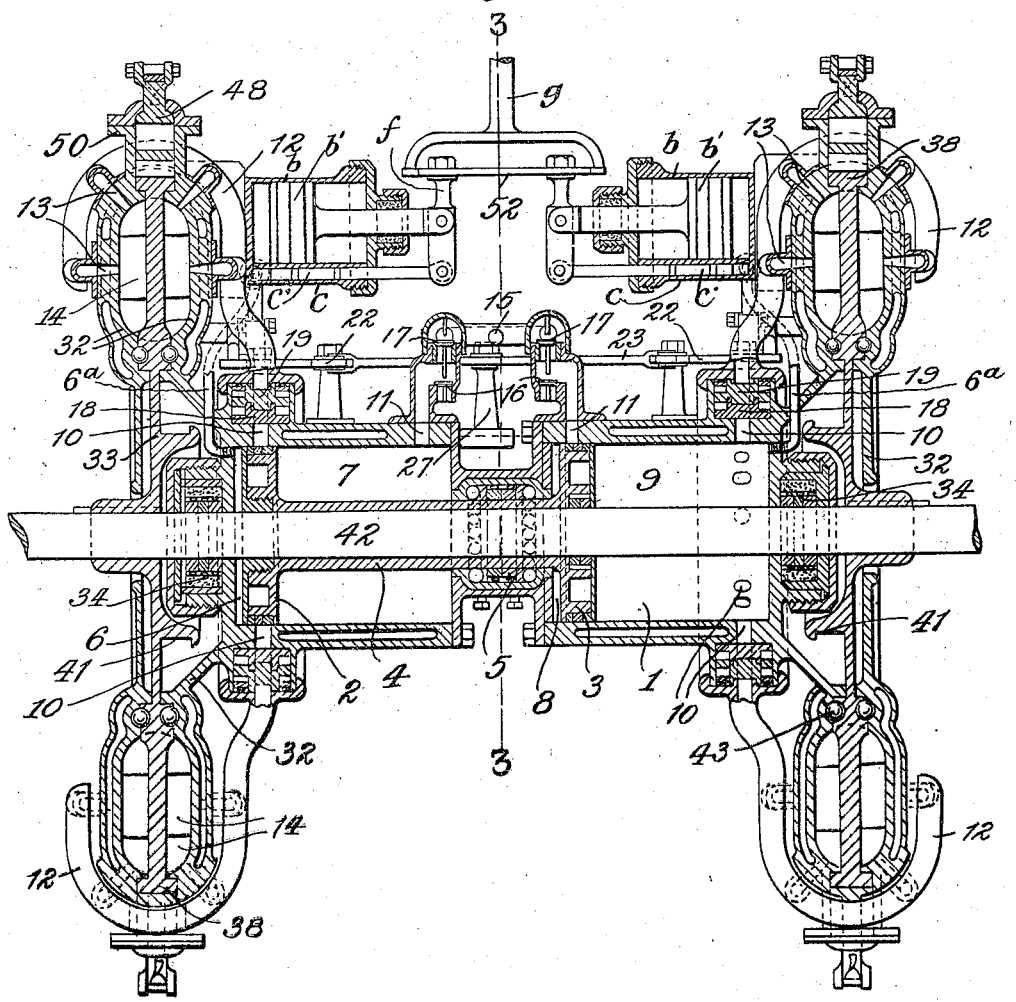
Figure 3:
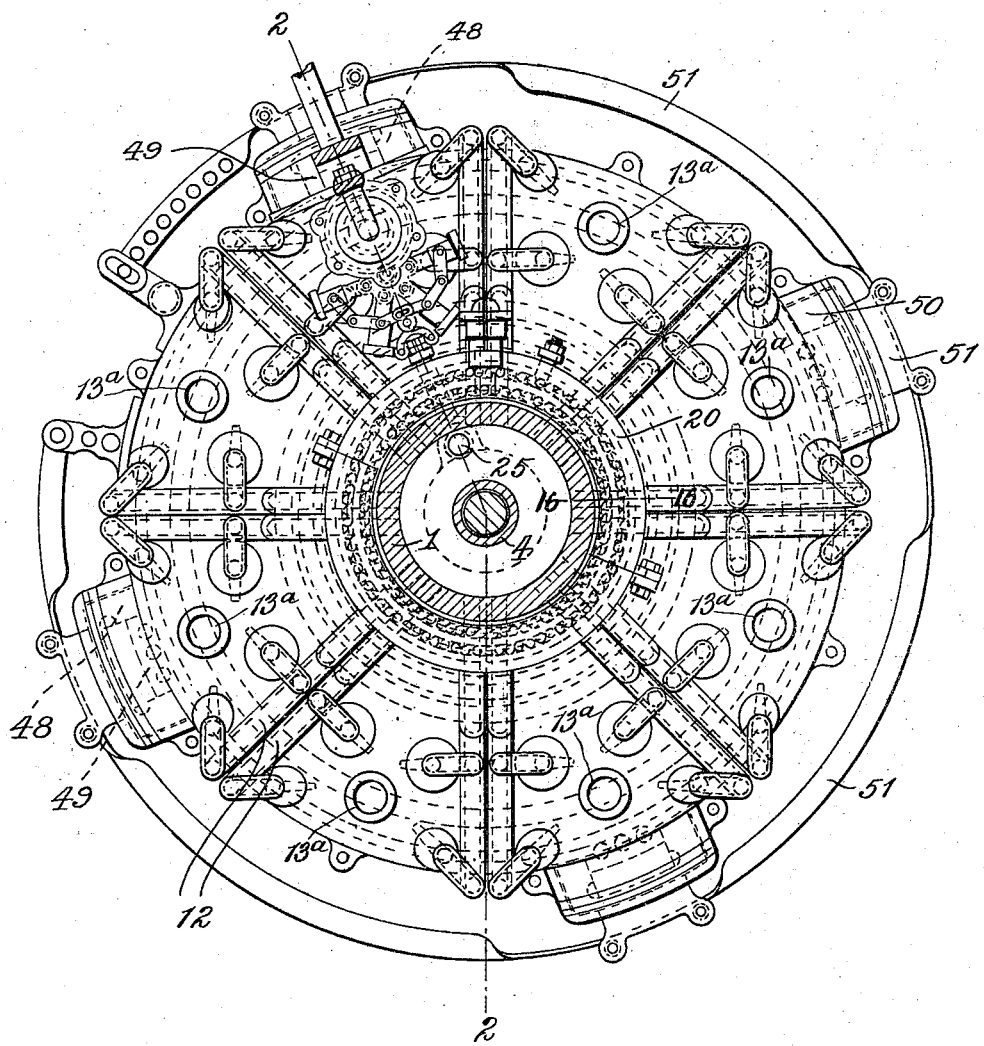
Figure 4:
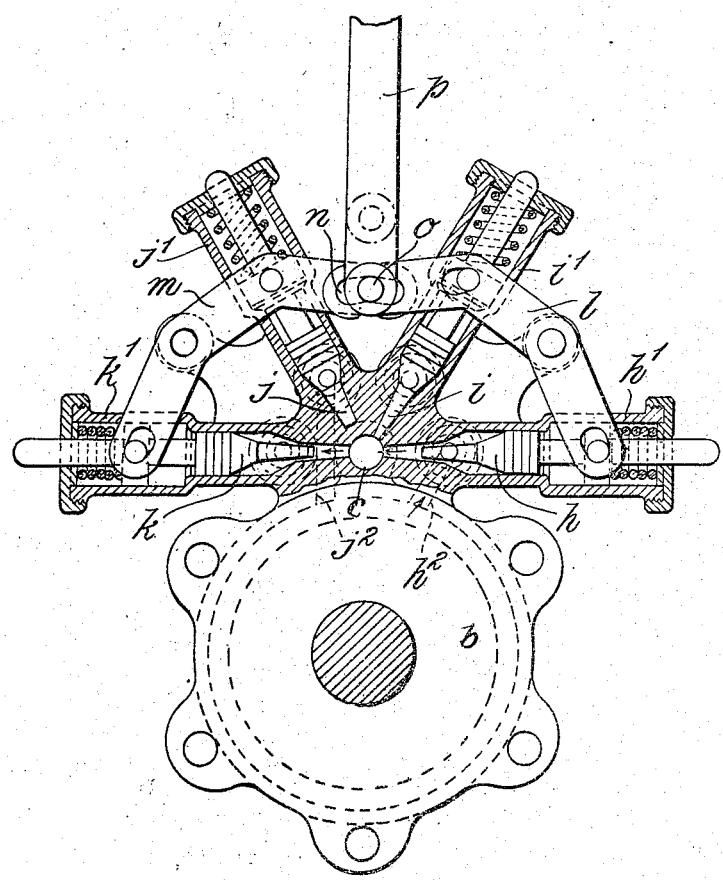
Figure 11:
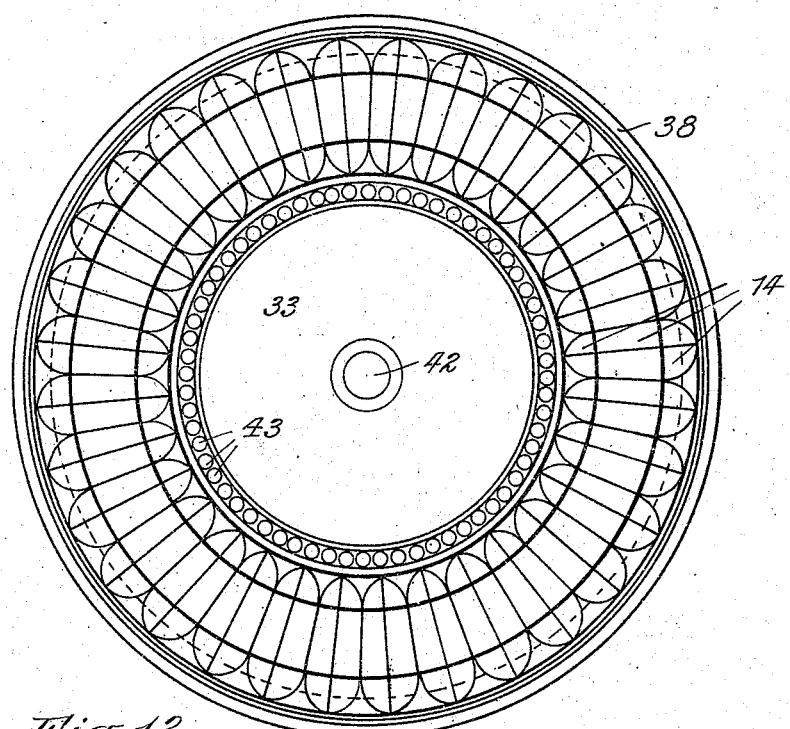
Figure 12:
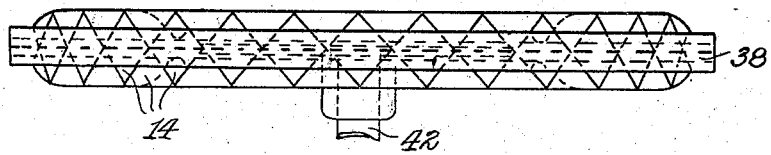
Figure 13:
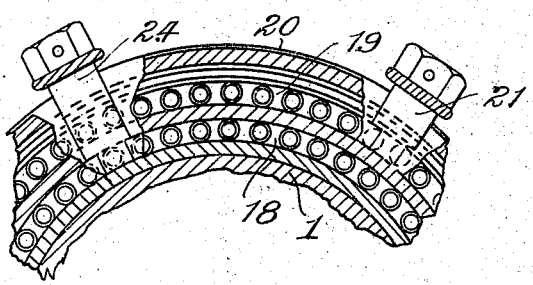
Figure 14:
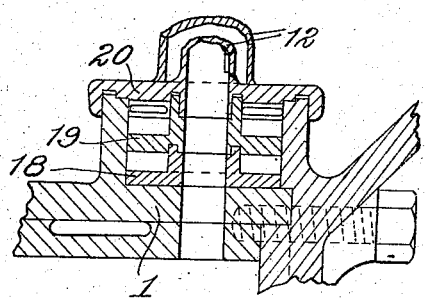
Figure 15:
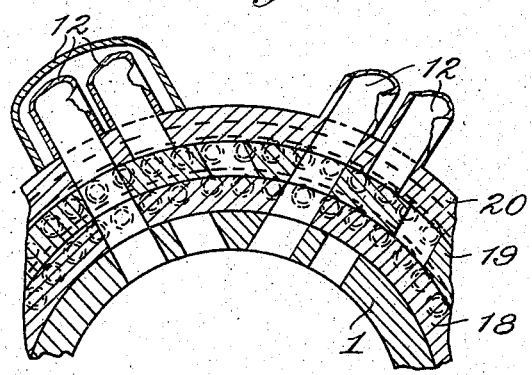
Figure 16:
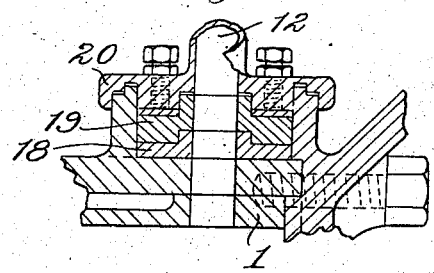
Figure 26:
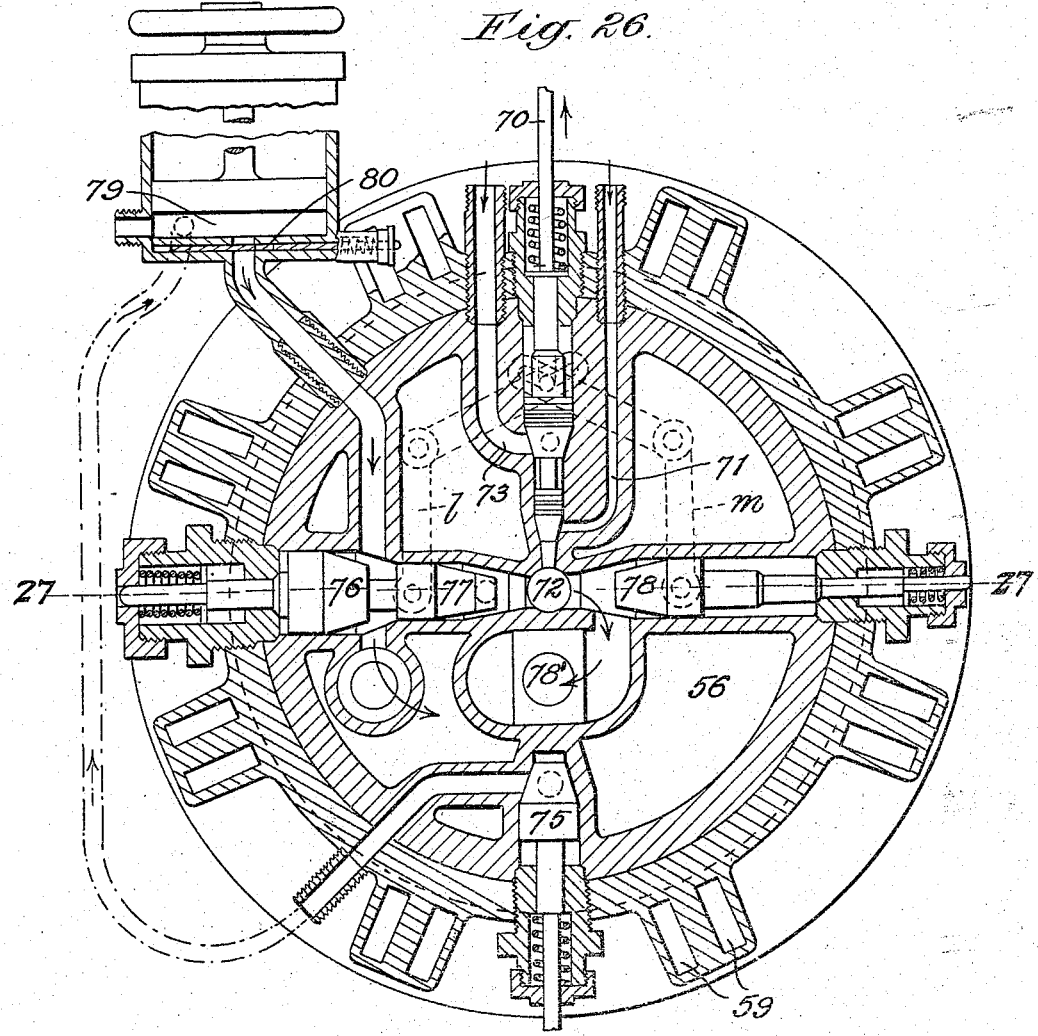
Figure 27:
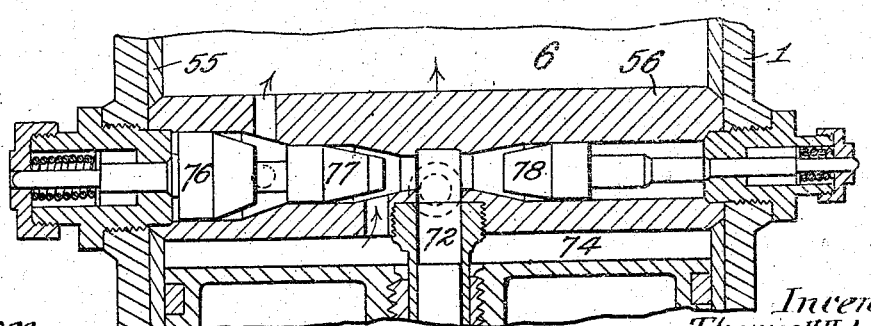

Figure 1 is a plan view showing the principal parts of an engine constructed according to my invention; Fig. 2 is a sectional elevation taken partly on the line 2—2, Fig. 3; Fig. 3 is a section on the line 3—3 of Fig. 2 with some parts omitted. Fig. 4 is a detail inverted and in part sectional view of one of the charge supplying devices. Fig. 5 is a section of one of the turbine boxes and the wheel rim on the line 5—5 of Fig. 6. Fig. 6 is a plan view of a portion of the wheel or rotor of the turbine with the rim omitted. Fig. 7 is a section on the line 7—7 of Fig. 5. Fig. 8 is a radial section, in the line of the axis of rotation, of a somewhat modified form of wheel rim. Fig. 9 is a section similar to Fig. 8 but showing a still different form of wheel and wheel rim, the section being confined to the peripheral portion of the turbine. Fig. 10 is a section on the line 10—10 of Fig. 9. Figs. 11 and 12 are detail views of the turbine wheel, Fig. 11 being a side view and Fig. 12 an edge view; Fig. 13 is a section on the line 13—13 of Fig. 1, but drawn to a larger scale. Fig. 14 is a detail section in a radial plane longitudinal of the axis of rotation of one of the combined distributing and cut-off valves. Fig. 15 is a section at right angles to the section of Fig. 14 and taken through the ports traversing the cut-off valves. Fig. 16 is a section on the line 16—16 of Fig. 3. Figs. 17 and 17a are longitudinal axial sectional views with some parts in elevation of respective halves of an engine of modified construction. Figs. 18 and 19 are longitudinal and cross sectional views, respectively, of the central division block and the adjacent portions of the cylinder containing it. Fig. 20 is an elevation of a portion of a modified form of distributing and cut-off valve structure. Fig. 21 is a section of a portion of one of the valve members taken in a plane perpendicular to the longitudinal axis of the valve member. Fig. 22 is a section on the line 22—22 of Fig. 21. Fig. 23 is an elevation of a portion of one of the distributing and cut-off valves adapted to be inserted in the structure of Figs. 20 to 22. Fig. 24 is a section on the line 24—24 of Fig. 23. Fig. 25 is a longitudinal axial section of one of the charge measuring devices arranged in the body of the cylinder. Fig. 26 is a section on the line 26—26 of Fig. 25. Fig. 27 is a section on the line 27—27 of Fig. 26. Fig. 28 is a diagrammatic view showing the working or general valve arrangements of an engine as in Fig. 17.

Referring generally to all the figures of the drawings and more particularly to Figs. 1 to 16 I employ a pair of co-axially mounted water jacketed cylinders 1, 1, (Figs. 1 to 3) or a single subdivided cylinder (Fig. 17) preferably, although not necessarily, of uniform dimensions. These where separate are connected together in various ways and also with a reversible turbine or turbines. A pair of pistons 2, 3, are connected together by a piston rod 4 passing through a suitable water jacketed stuffing box 5 between or in the cylinders forming with the end walls a plurality of chambers 6, 7, 8 and 9. The two chambers 6 and 9 in each cylinder form the combustion or explosion chambers, and the other two 7 and 8 serve for the compressing of air for combustion. Additional cylinders may, if desired, be added for this purpose. Ports or motive fluid conduits 10, 10, are formed in the combustion chambers, 6, 9, and other port holes 11, 11, are cut in the air or fluid chambers. The ends and covers may be provided or not with cushioning chambers, spring back pressure release check valves, blow off cocks, lubricators with pipes and couplings and with stop cocks. The motive fluid conduits 10, 10 convey the combustion products from the explosion chambers 6, 9 through internal or external conduits 12 to tapered nozzle jets 13 and on to the turbine blade boxes 14 and are so connected or coupled together to the turbine casings that they will deliver a constant even pressure at any desired or fixed angle to and through the nozzles. A governed air reservoir is suitably coupled up to a branch pipe at 15 (Fig. 1) which communicates through the medium of suction and non-return delivery valves 16, 17 respectively with the air compressing chambers 7 and 8, from which reservoir (not shown) it is led to a charge supplying device for admixture with fuel and delivered in specific proportions to the combustion or explosion chambers 6 and 9. The charges of fuel and air are exploded or ignited in any well-known manner by means of magneto or other ignition devices and sparking plugs.

For the purpose of controlling the escape of the exploded gases from the cylinders to the conduits leading to the turbine blades and also the direction of their action thereon I may employ a pair of partially rotating perforated rings or hollow sleeves 18, 19 moving one against the other. The rings 18, 19 are as shown mounted around the outer circumference of the cylinders 1 over the fluid conduit ports 10, 10, therein and on the inside of a channel or cover ring 20 containing or forming the terminating openings of the conduits 12. An operating pin 21 on the reversing or outer port ring 19 of each cylinder 1 is connected to one end of a bell crank lever 22, the other ends of both of which are coupled together by means of a rod or link 23 that can be controlled by hand for reversing the turbines. The pins 24 on the other two cut-off or inner port rings 18 are also connected to bell crank levers 24' or inclined planes but in this case the control is automatic and is determined by the pistons 2, 3 themselves which alternately bear upon the ends of a sliding rod 25, which may either be arranged in a single lug or boss connecting the two inner or adjacent cylinder covers Figs. 1 and 2 or in the central division block (Figs. 17, 18 and 19). This rod (or rods) when pushed to either of its extreme positions is adapted to come against a seating 26 in the opposite cylinder end to prevent any passing of gas from one cylinder to the other. Attached to this reciprocating rod is a pin 27 and an arm 28 which is connected through the medium of links 29, 29, with the before mentioned bell crank levers 24' and by this means the exhaust or delivery ports are alternately opened and closed by one or other of the pistons 2 or 3.

The charge measuring devices employed, Fig. 4, are constructed in the manner hereinafter described in the specification and comprise for each cylinder separate measuring cylinders and adjustable pistons 30, 31 for the air and fuel and in some cases one for the water, and the necessary mechanically controlled valves. These are suitably connected with their respective cylinders and each comprises preferably in one casting a large cylinder $b$ for the air and a small cylinder $c$ for the combustible fluid, petrol, ether, alcohol or the like and in some cases a similar one or a separate water measurer for the water or other liquid. The pistons $b'$ $c'$ in each of the cylinders are (although not so shown) adjustably connected to their piston rods so that they can separately be moved or adjusted to a definite position in their respective cylinder to increase or decrease the relative proportions of the mixture. All of the pistons $b'$, $c'$, and those which according to this invention are also provided for the supply of water, are adapted to be simultaneously adjusted by means of a lever or levers and a double cam plate or like disk 52 which engages with common studs $f$ connected to the separate piston rods and which is controlled by suitable manipulation of the shaft $g$. The cam 52 or other device adjusts the piston rods equally, so as to correspondingly increase or decrease the charge of the air, the combustible fluid and the water.

The control valves are arranged about the liquid fuel charging cylinder $c$ and comprise a plurality of inlet and outlet spring controlled needle valves $h$ $i$ $j$ $k$ mounted in cylinders $h'$ $i'$ $j'$ $k'$ with covers, stuffing boxes and piston rings. Two of the valves $h$ and $j$ are connected at $h^2$, $j^2$ with the air measuring device or cylinder $b$ and the one $h$ also with the fuel cylinder $c$. The valve $j$ controls the supply of compressed air from the main reservoir (not shown) to the measuring cylinder $b$, and the valve $i$ the supply of fuel to the cylinder $c$. The valve $h$ controls the supply of air from the cylinder $b$ to the outlet connection which is controlled by the valve $k$. The valves $h$ and $k$ and also $i$ and $j$ are arranged to be alternately operated in pairs to control the outlet and inlet passages, by means of two double levers $l$ $m$ fulcrumed between the pairs of valve cylinders. The two inner ends of the double operating levers $l$ $m$ are extended and suitably connected by means of slots $n$ therein and a pin $o$ to a vertically movable operating rod $p$, or other equivalent part. It will be understood that in the position shown in Fig. 4 the air from the cylinder $b$ is escaping past the valve $h$ and in its passage driving out the fuel from the cylinder $c$. Liquid or water injected or sprayed into the engine cylinders in a manner similar to that hereinafter described with reference to Figs. 25, 26 and 27, will be broken up into infinitesimal particles by the explosion and vaporized by the intense heat evolved and converted into a dense cool heavy vapor. If desired duplicate or separate cylinders may be added to the main charge mixing device for the supply of liquid or water and they would be simultaneously controlled in any convenient manner. The valves of the charge mixing device are adapted to deliver the air and the combustible under high pressure with great velocity to the explosion chambers. The governing of the engine when working on unequal loads can conveniently be done by increasing or decreasing the quantity and quality of the mixture supplied for combustion this being done by adjusting the pistons $b'$ $c'$ in the respective chambers.

Each of the outer casings or stators 32 of the two turbines in (Figs. 1 to 16) is formed in two halves the inner pair of which also form the outer ends or covers of the cylinders of the power generator, while in Fig. 17 the outer pair form the end covers of the cylinder. The rotors or turbine wheels 33 carrying the blades 14 may comprise disks (Fig. 2) which are keyed on and rotate a central shaft 42 passing through the two cylinders 1, 1 and the piston rod 4 and the double piston therein, passing out through suitable bearings and stuffing boxes 34. The outer casing of the machine may also as shown in Fig. 17, be made up of two or more sections which are suitably secured together by screw threads 35 on the cylinder casings and stators 32 which facilitate the quick dismantling and building up of the parts. The stators 32 when bolted together provide an oval or rectangular chamber in which the blades of the turbine wheel revolve and a circular inner groove, between gas tight bearings in which the blade box disk 33 passes. The turbine wheels or blade boxes 14 shown in Figs. 5 to 8 are of special composite construction and are built up on the disk or wheel 33 of a plurality of angularly disposed metal boxes which may be dovetailed to the said wheel or shaft disk 33 at 36 and to each other at 37; a brake or other rim 38 being provided to bind the whole together and give the greatest resistance to the pressure. Or if desired the whole of the boxes 14 can as in Fig. 17 be made in one piece as a blade rim. The blade boxes 14 are each internally and externally divided up circumferentially into the bottom and intermediate compartments or sections each of which forms a separate blade chamber on both sides of their center or diagonal lines and is provided with separate nozzles 13 (two only being shown in Fig. 2), for each circle of compartments. The sectional construction of the blade boxes 14 facilitates connection to the shaft or wheel disk 33, and disconnection for repair, said part 33 being also cut away at 36 to admit the dovetails and allow of their being slid around the circumference of the disk, the whole being keyed firmly, and the said openings being filled up to bind the whole together so as to form an even part of the rim, but these sectional arrangements may be readily varied. The conduits 12 and nozzles 13 may be externally arranged as tubes (Figs. 1 to 3) or they may be cast integrally with the stator casings 32 as in Fig. 17. The nozzle jets 13 are arranged in forward and reverse pairs, the supply of gas to which is governed by the forward, reverse and cut off valves 19 and 18. Exhaust passages 13$^a$, which are of course of larger sectional area than that of the nozzle jets 13, are formed at convenient points. This method of delivering the motive fluid all around inside and outside the blade boxes forms an important feature of the turbine construction. The angular side points of the blade boxes are as shown in Fig. 6 cut off flat to form a true running face and are provided with serrated or small V grooved radial striations 40 which act as small blades and leakage grooves as the blade boxes 14 are passing the nozzle orifices 13. An intermediate brake rim 41 may be provided on the turbine wheel or disk 33 or on its axle boss according to requirements.

Instead of, as in the turbine construction just described, attaching the two turbine wheels to a common shaft 42 passing through the pistons 2, 3 and piston rod 4, the cylinders themselves could be made to pass through the turbine casing and in this case the turbine would be mounted immediately over the cylinders substantially as shown in Fig. 17. Antifriction or other known bearings may be employed between the turbine wheels and the stators 32. A single cylinder as in Fig. 17 is found very suitable for use in connection with stationary engines, electrical machinery, rail or motor vehicles, marine or aeronautical machines or vessels. The fluid conduits 12 would in such constructions be conducted from the inner or underside of the casings 32 directly to the nozzles 13 of the turbine. Where the turbines are incorporated in wheels or in the rotors of dynamoelectric machines, or in propellers for marine or other work, the parts driven by the turbines may be attached directly to the turbine wheel blades 14, which then pass out through the casing 32 in a manner similar to the tires or rings 44 of Figs. 9 and 10. For the purpose of holding the two halves of the casing 32 to the wheel rim or other like part 44 I may provide one or more openings in the casings and the rim of the wheel to accommodate dovetail segments 45 which secure the parts together but allow of relative rotation. Sufficient room or gap is of course provided to admit of the insertion of the respective dovetails. The sections of the double dovetail rings embedded in each of the turbine half casings and wheel rims are kept stationary by set screws or the like 46 so that the wheel rims revolve freely around the dovetail rings or the two halves of the turbine casing could in such cases be bolted together through the lower half of the casing to the cylinders. The motive fluid conduits in such a construction formed out of the solid water jacketed turbine casing could be arranged to terminate opposite to one another and so as to correspond with openings 47 in the rim 44 by which means the motive fluid can be passed from the jets on one side to the jets on the other side through the passages 47 through the wheel or other rim and over the turbine blade boxes 14. Thus these conduits 12 form in conjunction with those 47 in the wheel rim 44 a continuation of those on the opposite side. These conduits 47 across the wheel rim may be cut in long or short segments of circles and be supported at intervals by solid parts of the wheel rim. The conduits may also be carried under and across the inner casing or as in Fig. 17 formed on or in the outside of the cylinders from which the motive fluid can be conducted through separate ports leading direct from the cylinder conduits to conduits on each side of the turbine casing. Extra circular cut-off valves may be required to equalize the delivery of fluid to the right or left and give an even thrust all around the blade boxes and their entire circumference.

In the modified construction shown in Figs. 17 to 27 where as previously described a single subdivided cylinder casing is employed a central division piece 53 containing the packing 5 and the slide rod 25 may also contain the suction and non-return delivery hydraulic or air valves 16 and 17 respectively and can be fixed in position by means of fixing pins 54 Fig. 19, which serve as lubricant channels, and cylindrical liners 55. In this case also the charge measuring device valves may as shown for convenience of construction be arranged inside the cylinder 1 in an additional pair of division blocks 56, 56, and the charge measuring pistons 30, 31, like the pistons $b'$, $c'$ of the first form described, are mounted coaxially on the outsides thereof and on the inside of the end covers which are formed by the outer turbine wheel casings 32. The operating piston rods $30^x$ and $31^x$ are brought out coaxially through packings 57 in the end covers 32 and operated by means of suitable rods and lever connections connected from the valve operating rod 25, shown diagrammatically in Fig. 28, and hereinafter described. In this case the pistons 30 and 31 are arranged to move forward or reciprocate to prevent any expansion of the compressed air in its delivery to the combustion chamber.

As shown in Figs. 25 and 26 I employ an upwardly moving combined fuel and air valve 70 controlling the supply of fuel along the conduit 71 to the cylinder 72 and the supply of air from the conduit 73 to the cylinder 74. A back pressure relief tappet valve 75 for the main explosion chamber 6 or 9, is also provided in conjunction with another double valve 76, 77, and another single valve 78. A measuring cylinder 79 is arranged outside the main cylinder casing and the water is forced out under pressure by the back pressure gases upon the operation of the slide valve 80. The valve 77 controls the supply of air from the chamber 74 through the fuel chamber 72 to the combustion chamber 6, or 9. The valve 78 controls the opening between the fuel chamber 72 and the non-return supply valve 78' for the fuel and air entering the combustion chamber.

The reversing ring 19 and the cut off sleeve 18 and their cover 20 shown in Figs. 17 and 20—24, are of modified construction, they being designed to resist the pressure without tending to become locked against each other. The outer cover comprises a pair of flanged segments 20, 20, that are adapted to be secured in a gas tight manner upon flanges 60 in which the pairs of forward and reverse conduits 12 and 59 terminate. The oscillating cut-off ring 18 is made in the form of box of two semicircular segments that can be suitably adjusted as to diameter by means of a right and left handed screw stud 61, and this is covered by or mounted within the reversing ring 19 which is now of inverted channel section with single ports in its side faces. In this case I also employ an additional cut off disk ring 62 with single ports therein and this enables the gases from the combustion chambers to be utilized for driving singly or in same direction or diametrically opposite to each other both the turbine wheels by means of the conduits 59. The circulating or cooling water may be forced around helical grooves 63 in the inside of the cylinder casting and outside of the cylinder liners and through the water jackets of the division blocks 53 and 56 which jackets are suitably connected therewith for this purpose.

A brake is employed and consists of one or more blocks 48 provided to bear on the outer rim 38 of the turbine blade boxes. The brake blocks 48 are suitably recessed to contain a spring controlled sliding anti-friction brake block 49 and the whole may be mounted in casings 50 in the main turbine case or other convenient position. Suitable projections or lugs 51 on the main brake block 48 project out through the casings 50 where they are connected with a twisted brake band 51 that is adapted to be tightened around the circumference of the turbine casing by hand or power in any convenient manner. This action serves to push the blocks inwardly, at first only bringing into play a light friction due to the action of the spring pressed roller block 49 and afterward the main or rigid braking surfaces come into effect. The brake action enables the speed of the turbine to be evenly controlled or graduated as desired. Pin holes are provided in the brake operating band for purposes of adjustment. This construction of brake block is also applicable to the auxiliary brake, and can be actuated by the exhaust energy, air, water steam or electrical appliances.

The proper governing of the speed and the equal running of the turbine when working on unequal loads, such as sudden demands for electric energy—is governed by the increase or the decrease of the quantity of explosive mixture delivered for explosion. When the turbine is reversed the motive fluid within the turbine will itself act on the blades as a brake as will be readily understood. Both the explosion cylinders 6, 9, the turbine casings 32 and the wheels 33 and their blade boxes 14 are or may be provided with water jackets where required to keep the various working parts cool as is well known in internal combustion engines.

The operation of the combined apparatus is as follows:—To start the engine, the compressed air reservoir connected at 15 (Figs. 1, and 19) is charged to a given pressure and connected with the air measuring chamber of the charge measuring device; the fuel reservoir is also charged with fuel and connected with the charge measuring device. The operator has then only to throw over the lever actuating the circular cut-off valve 18 which at the same time pushes over the lever which controls the valves of the charge measuring device to permit the admixture of compressed air and fuel and the discharge of the adjusted quantity of mixture for ignition in one explosion chamber 6, through a pipe or conduit 6ª connecting each charge measuring device with the respective explosion chamber, in combination with water or other cooling liquids, if desired from a separate measuring device, Fig. 26. Immediately on the admission of the explosive mixture to the chamber the magneto ignition device is operated and an explosion takes place, the water or liquid that is admitted into the explosion chamber with the explosive fluid is broken up and vaporized instantaneously, thereby considerably reducing the heat caused by the explosion to any required degree, and intensifying the density of the gaseous mass, generating or developing a large volume of steam, and the necessary pressure is produced to move the pulsating piston one stroke. This movement compresses the air on the other side of the piston in 7 or 8 and discharges compressed air into the air reservoir or other devices at 15 until the back end of the piston comes into contact with one end of the slide rod 25 controlling the outlet valve 18. The piston pushes over the slide rod 25, opens the charge measuring device valves of the other cylinder, the exhaust back pressure spring valves (Fig. 26), and moves the circular cut-off slide valves 18, to instantaneously discharge the contents of the second charge mixing device into the second explosion chamber 9, and by ignition the second explosion takes place which by means of the double-headed piston compresses the gases in 6, which are imprisoned until this takes place when it is thereby forced out under great pressure and velocity to the turbines in an even equalized manner. The exploded mixture in the second cylinder 9 is imprisoned until the developed or resultant gases are expelled from the opposite cylinder and the back portion of its own piston 3 compresses the air in 8 and reaches and pushes the sliding rod 25 back again. The operation of the rod 25 actuates first an exhaust pressure spring valve, releasing any pressure remaining in the explosion chamber after the ports 10 and conduits 12 are cut off if necessary.

This apparatus is adaptable to every class of power generating machinery or engines such as stationary engines or electrical machines motor road or rail vehicles, motor boats, flying machines, aeroplanes and ships, as it enables much complicated gearing and construction to be dispensed with and as a result diminishing friction and reducing upkeep.

What I claim as my invention and desire to secure by Letters Patent is:—

1. An explosion apparatus for developing and generating power comprising a plurality of explosion chambers, a turbine wheel for each chamber, means for causing the explosion of a charge in one explosion chamber to compress an exploded charge in the other explosion chamber, and means for directing the compressed exploded charge to the respective turbine wheel.

2. An explosion apparatus for developing and generating power comprising a plurality of explosion chambers, a reciprocatory member in each chamber connected for simultaneous movement with the reciprocatory member of the companion explosion chamber, the reciprocatory member in one chamber responding to the action of an exploded charge therein to cause the reciprocatory member in the companion chamber to compress an exploded charge therein, a turbine wheel individual to each explosion chamber, and a valve mechanism timed in action to direct an exploded charge after compression to the respective turbine wheel.

3. An explosion apparatus for developing and generating power comprising a pair of closed cylinders, a piston in each cylinder, a turbine wheel individual to each cylinder, a connection between the pistons for causing them to move simultaneously, each cylinder being divided by its piston into an explosion chamber on one side thereof and a compression chamber on the other side thereof, connections between each explosion chamber and a respective turbine, valved conduits leading from each compression chamber, and a valve between each explosion chamber and its respective turbine timed in action to connect the explosion chamber with the respective turbine after the respective piston has completed a power stroke and has been returned to compress the exploded charge.

4. An explosion apparatus for generating and developing power comprising a pair of cylinders, a piston for each cylinder connected to the piston of the other cylinder for simultaneous movement therewith, the two pistons having a relative alternate action with respect to their cylinders, the part of each cylinder on one side of the piston constituting an explosion chamber and on the other side a pumping chamber, a valve structure connected to the pumping chamber for conducting fluid under pressure therefrom, a turbine wheel individual to each explosion chamber, the turbine wheels being connected for simultaneous movement and each piston acting alternately as a power piston to compress the exploded charge in the other cylinder, and valve mechanism timed to open the explosion chamber to its respective turbine wheel on the completion of the stroke of the respective piston causing the compression of the exploded charge.

5. An explosion apparatus for generating and developing power comprising a pair of cylinders, a piston in each cylinder connected to the piston of the other cylinder for simultaneous movement therewith, the two pistons having a relative alternate action with respect to their cylinders, the part of each cylinder on one side of the piston constituting an explosion chamber and on the other side a pumping chamber, a valve structure connected to the pumping chamber for conducting fluid under pressure therefrom, a turbine wheel individual to each explosion chamber, the turbine wheels being connected for simultaneous movement and each piston acting alternately as a power piston to compress the exploded charge in the other cylinder, and valve mechanism timed to open the explosion chamber to its respective turbine wheel on the completion of the stroke of the respective piston causing the compression of the exploded charge, said last named valve structure including means for the admission of a fresh charge under compression to the respective explosion chamber after the compressed exploded charge has passed to the turbine wheel.

6. An explosion apparatus for generating and developing power, comprising a rotatable turbine structure, an explosion device having means impelled by an exploding charge to compress an exploded charge, means for directing the compressed exploded charge to the turbine structure to propel the same, and means for adjusting the said means for directing the compressed exploded charge to the turbine structure to cause the rotation of said turbine structure in either direction at will.

In testimony wherof I have hereunto set my hand in the presence of two subscribing witnesses this 10th day of March 1911.

T. HOWARD HOLROYD.

Witnesses:
J. S. ALLTRYS,
D. HAKEY.

Copies of this patent may be obtained for five cents each, by addressing the "Commissioner of Patents, Washington, D. C."